United States Patent [19]

Crookshanks

[11] Patent Number: 4,754,449
[45] Date of Patent: Jun. 28, 1988

[54] WIDE BANDWIDTH DEVICE FOR DEMODULATING FREQUENCY DIVISION MULTIPLEXED SIGNALS

[75] Inventor: Rex J. Crookshanks, Palos Verdes Estates, Calif.

[73] Assignee: Hughes Aircraft Company, Los Angeles, Calif.

[21] Appl. No.: 881,439

[22] Filed: Jul. 2, 1986

[51] Int. Cl.⁴ ................................................. H04J 1/02
[52] U.S. Cl. .......................................... 370/70; 370/50
[58] Field of Search ...................... 370/23, 50, 69.1, 70

[56] References Cited

U.S. PATENT DOCUMENTS

| | | | |
|---|---|---|---|
| 3,328,528 | 6/1967 | Darlington | 370/70 |
| 3,971,922 | 7/1976 | Bellanger et al. | 370/70 |
| 4,199,660 | 4/1980 | Dill et al. | 370/50 |

FOREIGN PATENT DOCUMENTS 2043402 10/1988 United Kingdom ................. 370/70

*Primary Examiner*—Douglas W. Olms
*Assistant Examiner*—Wellington Chin
*Attorney, Agent, or Firm*—S. M. Mitchell; M. J. Meltzer; A. W. Karambelas

[57] ABSTRACT

A device for transforming N-Frequency Division Multiplexed (FDM) channels (21) of modulated signals into individually accessible streams (46) of demodulated data employs a Fourier transform processor (10) to transform the N-FDM channels into a single, TDM (Time Division Multiplex) channel of data, a single demodulator (12) for demodulating the single TDM channel and a demultiplexer (14) for demultiplexing the single channel of TDM data. The symbol segments of the N-FDM channels are synchronized with each other using an error signal generator (78) and a dither technique in which a symbol window is shifted back and forth to determine whether the symbol segments are early, on time or late. In a preferred form, the demodulator and error signal generator are implemented using digital techniques. The Fourier transform processor (10) includes a pair of analog dispersion sections (26, 42) for introducing delays in the FDM signals as nominal monotonic delay functions of frequency, a frequency sweep section (35) and a calibration section (45) for compensating for deviations in the differential delay for functions such that the output of the second analog dispersion section is substantially that calculated for an ideal system.

24 Claims, 3 Drawing Sheets

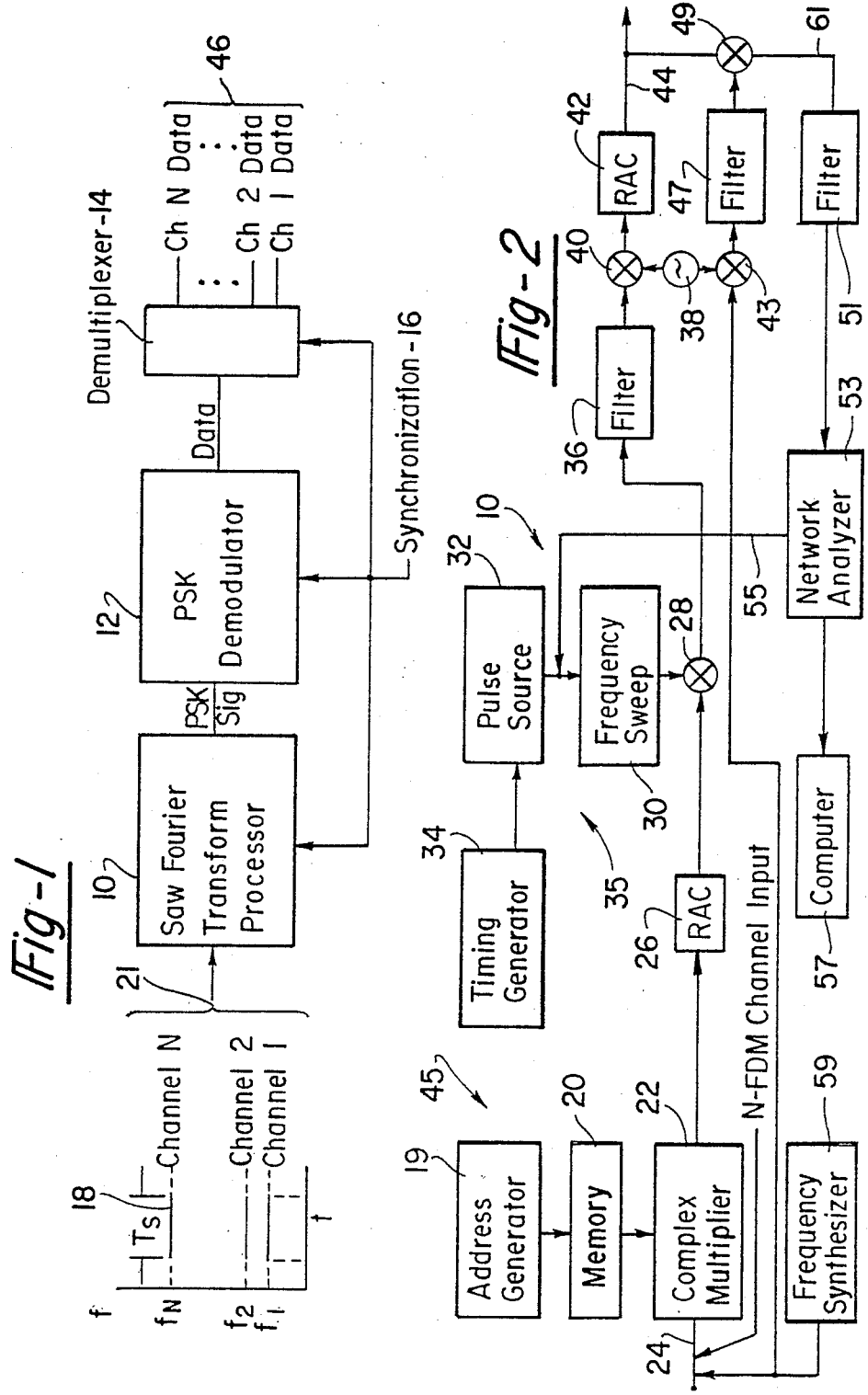

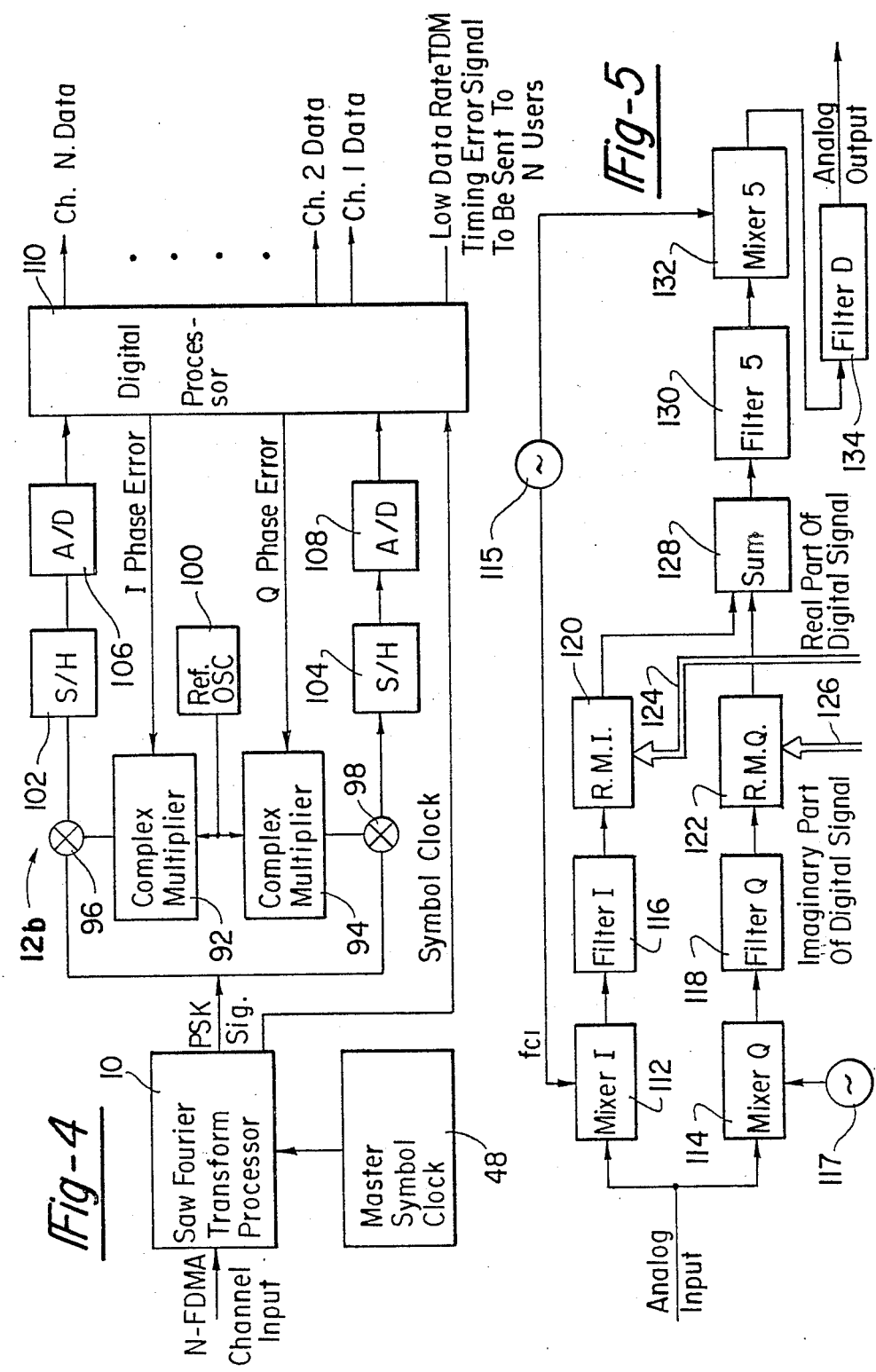

WIDE BANDWIDTH DEVICE FOR DEMODULATING FREQUENCY DIVISION MULTIPLEXED SIGNALS

BACKGROUND OF THE INVENTION

The present invention broadly relates to telecommunication systems, and especially those employing frequency sweep devices. More particularly, the invention deals with a wide bandwidth device for demodulating frequency division multiplexed (FDM) signals.

Telecommunications systems for digital data often use the technique of transmitting the data from different sources or users on signals of different frequency, more commonly known as FDMA (Frequency Division Multiple Access). In FDMA, each signal of "channel" of a user is assigned a discrete portion of the transmitted-frequency spectrum so that many channels can be transmitted over a single transmission medium. Typically, PSK (Phase Shift Keying) techniques are employed in which a constant amplitude carrier has its phase angle varied in accordance with the digital intelligence from the corresponding source.

In the past, the transmitted information has been recovered at a receiver using a separate PSK demodulator for each of the FDMA channels in order to provide individually accessible streams of data associated with each transmitting source thereof. These previous demodulators sometimes include so-called "fast Fourier transformers" (FFT's) for transforming the frequency division multiplexed signal into a time division multiplexed signal. FFT's of this type perform processing of the signal after it has been converted from analog to digital form. Typically, FFT's employ digital multipliers, ROM-stored tables and "butterfly" digital connections in order to perform the signal conversion. The bandwidth of these FFT's is limited by the conversion rate of the associated analog-to-digital convertor and the system clock rate. It is, primarily, the relatively limited bandwidth of FFT's which necessitates the use of separate demodulators for demodulating each channel of a frequency division multiplexed signal. The use of separate PSK demodulators to accommodate each of the FDMA channels, while adequate for some purposes, is impractical for other applications where a receiver's weight, power and complexity are critical factors, as for example in regenerative satellites.

The present invention overcomes the problems associated with the prior art receivers by converting N channels of FDMA data into individually accessible streams of demodulated data, using a single, highly accurate, wide bandwidth demodulator.

SUMMARY OF THE INVENTION

In accordance with the present invention, a device for transforming N-FDMA channels of modulated data into individually accessible streams of demodulated data employs a wide bandwidth, surface acoustic wave (SAW) Fourier transform processor for transforming the N-FDMA channels into a single time division multiplexed (TDM) channel of modulated data, a single demodulator for demodulating the single TDM channel of modulated data and a demultiplexer for demultiplexing the single channel of TDM data to provide the individually accessible streams of demodulated data. The FDMA data is phase shift key (PSK) modulated to produce symbol segments for each FDMA channel which are simultaneously processed by the Fourier transform processor. The output of the Fourier transform processor is a phase modulated carrier signal which sequentially, during each sweep of the N-FDMA input channels, assumes the phase of the modulation on each of such channels.

The symbol segments of the N-channels are synchronized with each other in order to enhance data transmission accuracy by dithering a symbol window back and forth to determine whether the symbol segments of each channel are early, on time or late. The dithering technique is employed in combination with an error signal generator which senses the amplitude of each demodulated symbol segment, compares the detected amplitude with the amplitude of the last detected value for the same channel and generates a timing error signal which is delivered to the transmitting source using multiplexing techniques, thus allowing the sources (users) to adjust the data transmission timing of their communication channel in order to achieve collective synchronization of the symbol segments.

In a preferred form of the invention the demodulator and error signal generator are implemented using digital techniques.

The inherent inaccuracies of the SAW Fourier transform processor are corrected by precise digital preprocessing of the FDMA signal before it is converted into digital form. Signal preprocessing is achieved by generating a correction signal which is used to condition the FDMA input signals. As a result of signal preprocessing, the FDMA channels are compressed to provide greater operating bandwidth, the transfer characteristics of the signals are improved, accurate timing of the final transform is achieved and the symbol periods of the input signal are properly aligned.

The SAW Fourier transform processor includes a pair of analog dispersion sections for introducing differential delays in the FDM signals as nominal monotonic delay functions of frequency, a frequency sweep section and a calibration section for compensating for deviations in the differential delay functions such that the output of the second analog dispersion section is substantially that calculated for an ideal system.

BRIEF DESCRIPTION OF THE DRAWINGS

In the drawings, which form an integral part of the specification and are to read in conjunction therewith, and in which like reference numerals are employed to designate identical components in the various views:

FIG. 1 is an overall block diagram of a wide bandwidth device for demodulating FDMA signals in accordance with the present invention;

FIG. 2 is a block diagram of the primary components of a form of a Fourier transform processor which forms a portion of the device shown in FIG. 1;

FIG. 4 is a block diagram of the preferred form of the device shown in the system of FIG. 1; and, FIG. 5 is a block diagram of a complex multiplier suitable for use in the device shown in FIG. 4 and the Fourier transform processor shown in FIG. 2.

DETAILED DESCRIPTION OF A PREFERRED EMBODIMENT OF THE INVENTION

Figure 3:
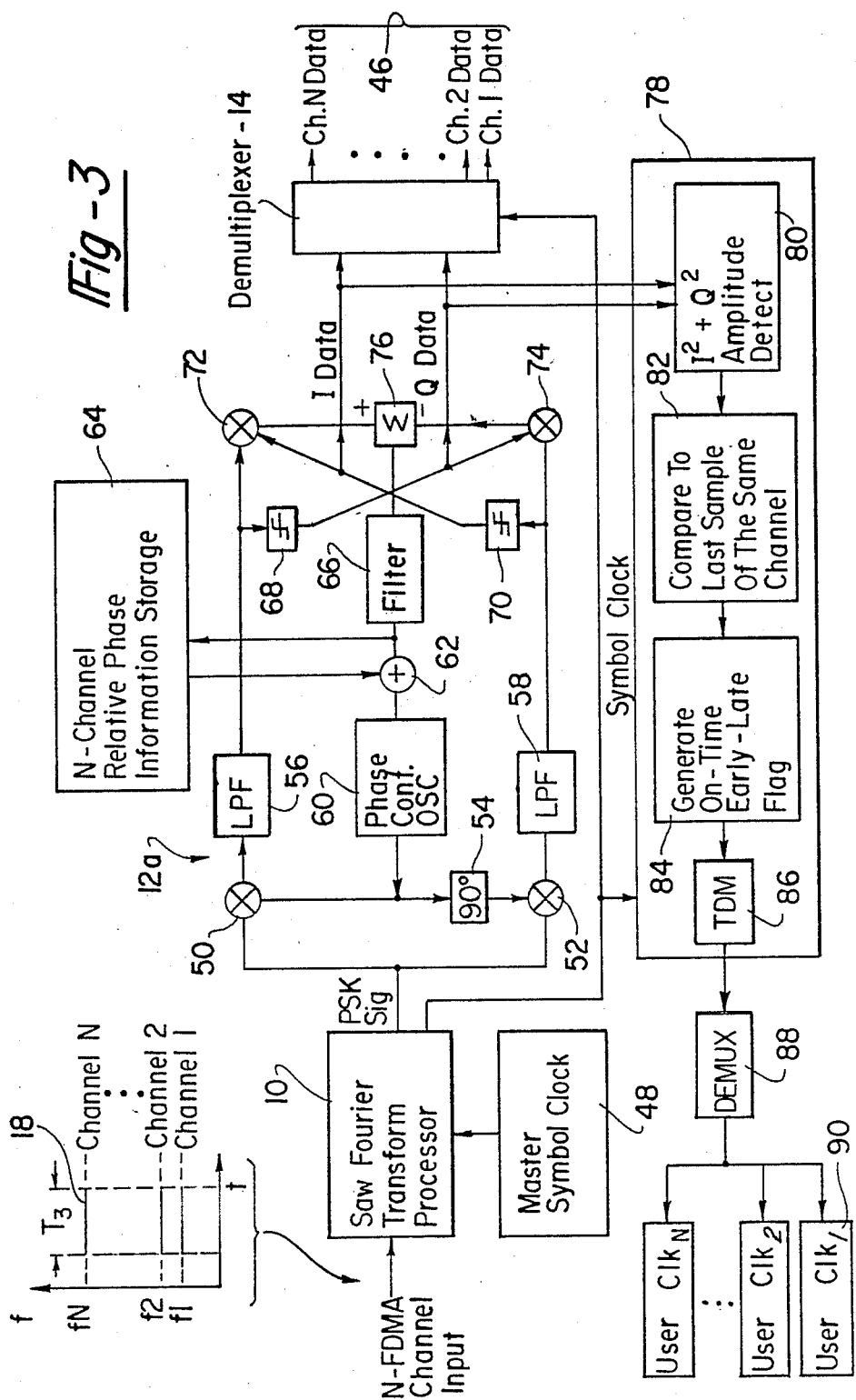
FIG. 3 is a block diagram of one form of the device shown in the system of FIG. 1, including an error signal generator.

Referring first to FIG. 1, the present invention broadly involves a system for demodulating frequency division multiplexed signals in a telecommunications system, consisting of N-FDMA channels 21 of PSK signals, each including successive symbol segments 18 having a symbol period $T_s$. In the FDMA telecommunications system disclosed herein, each signal or channel employed to transmit digital data from a user is assigned a discrete portion of the transmitted frequency spectrum, thus allowing the N channels of data to be transmitted over a single transmission medium. The symbol segments 18 for each channel may be formed using PSK (phase shift keying) techniques in which a constant amplitude carrier has its phase angle varied in accordance with digital intelligence from the transmitting source. The system for demodulating FDMA signals according to the present invention is in the form of a receiver shown in FIG. 1, which comprises a Fourier transform processor 10, a PSK demodulator 12 and a demultiplexer 14. The processor 10 receives the N-channels 21 of frequency division multiplexed signals from a plurality of user sources. During each symbol period $T_s$, the N channels of PSK modulated data are processed by the Fourier transform processor 10 to yield a phase modulated carrier which sequentially, during each sweep of the channels by the processor 10, takes the phase of the modulation on each of the input PSK channels 21. As will be later discussed in more detail, sychronization is provided in order to synchronize the symbol segments as each signal is demodulated and for aligning the symbol segments 18 so that they are received substantially simultaneously from the sources at the input of the processor 10.

As mentioned above, the output of the Fourier transform processor 10 for each sweep of the N-channels 21 is a sequence of pulses on the carrier which are delivered to the input of the demodulator 12 and which sequentially take the phase of the modulation on each of the N-input channels 21. Consequently, the processor 10 transforms the N-FDMA channels 21 of PSk data into a single time division multiplexed (TDM) channel of PSK data which is then demodulated by the single demodulator 12. The single channel of demodulated data output from demodulator 12 is received and demultiplexed by the demultiplexer 14 and is output as N streams or channels 46 of individually accessible demodulated data.

The details of a suitable Fourier transform processor 10, of the type employing surface acoustic wave devices, is shown in more detail in FIG. 2. The processor 10 shown in FIG. 2 employs spectrum analysis of the N-FDMA channels 21 of PSK signals using digital and analog techniques which implement a Fourier transformation. For example, the input to the processor 10 of a single symbol segment 18 of period $T_s$ of a phase modulated carrier at frequency $f_s$ is defined by:

$$v_i(t) = e^{j\Psi} \cdot e^{j2\pi f_s t} \cdot T_s(t)$$

Where $\Psi$ is the modulating phase, constant over the symbol period $T_s$, $e^{j2\pi f_s t}$ is the carrer and, $|T_s|(t)$ is 1 for $-\frac{T_s}{2} \leq t \leq \frac{T_s}{2}$, and zero otherwise and zero otherwise.
Thus, the output of the processor 10 consisting of the Fourier transform of the input times a carrier is defined by:

$$v_o = e^{j\Psi}[F\{e^{j2\pi f_s t}\} * F\{|T_s|(t)\}]e^{jfcu}$$
$$= T_s e^{j\Psi} e^{jfcu} \frac{\sin(\pi T_s(u - f_s))}{\pi T_s(u - f_s)}$$

Where F(x) is the Fourier transform for x and * indicates convolution, and were $V_o(u)$ is the output of the processor 10 at time u.

Thus, the output of the processor is a carrier $e^{jfsu}$, with the same phase modulation and the same energy as the input, but which is time windowed by the term:

sin (.)/(.)

Furthermore, this time windowing has a mainlobe peak at the time instant corresponding to the frequency of the input ($f_s$), and the mainlobe goes to 0 at the time instant corresponding to the frequencies $f_s \pm 1/T_s$.

The processor 10 employs surface acoustic wave (SAW dispersive sections in the form of reflective array compressors (RAC'S) 26 and 42, an intermediate frequency sweep section generally indicated at 35, which includes a timing generator 34, a pulse source 32, a frequency sweep 30 and a bilinear mixer 28. The RAC's 26 and 42 may be manufactured by etching into a crystalline sustrate, e.g. lithium niobate, a multiplicity of slits, each tuned to reflect a given frequency. By reflecting different frequencies at different slits, and thus different locations, differential delays are introduced into a through-going signal as a function of frequency. The processor 10 also includes a calibration section generally indicated at 45 which functions to compensate for distortions introduced into the signal as a result of the components of the processor 10, and particularly imperfections in RAC's 26 and 42.

The calibration section 45 includes a complex multiplier 22 for multiplying the incoming signal on its input 24 by a calibration function defined by a series of complex, digital words. The calibration function is stored in a memory 20, which may comprise a read-only memroy (ROM). The individual digital words are read from the memory 20 in response to address signals from an address generator 19. The addressing function of the address generator 19 and the timing generator 34 are synchronized with the on-set of a symbol period $T_s$ by the synchronization means 16 which may comprise a suitable master symbol clock. The input signals of the N-FDMA channels 21 are within a predetermined frequency range, e.g. 50 MHz to 300 MHz. Within this frequency range are include a multitude, e.g., 1000, narrow band channels each assignable to a PSK signal.

Each PSK channel represents a stream of binary data at a predetermined, common baud rate. All of the N channels 21 switch from one bit or symbol segment to the next simultaneously. By way of example, there may be 1000 FDMA channels present, and the baud rate may be 10 kHz, with a corresponding symbol duration period $T_s$ of 100 microseconds. In the case of this example, the output of the processor 10 would consist of a series of 100 microsecond segments, each comprising 1000 "pulse windows" spaced 100 nanoseconds apart.

The first RAC 26 introduces differential delays as a function of frequency into the incoming signals. The delay introduced at the lower end of the incoming signal's frequency range is one symbol longer than the delay introduced into the high end of the frequency range. The first RAC 26 is linear so that the delays ntroduced at the intermediate frequencies are readily determined by interpolation. The originally concurrent segments of the incoming signal are staggered as they exit from the first RAC 26, and these staggered components are mixed with frequency sweep output at the bilinear mixer 28. The frequency sweep section 35 is synchronized with the incoming signal by the synchronization means 16 so that each frequency sweep sweeps an entire set of staggered segments. A post mixer filter 36 eliminates the sum term from the mixing process so that only the difference term of the product progress through processor 10.

Local oscillator 38 is provided to generate translation signals for centering the frequency range of the series of sweeps on the center frequency of the pass band of the second RAC 42, which, in this particular embodiment is the same as that of the RAC 26. The translation signal from the oscillator 38 is mixed with the series of sweeps at a second bilinear mixer 40.

The RAC 42 is nominally idential to RAC 26 and introduces differential delays as a monotonic function of frequency into the through-going signal. The effect of RAC 42 is to "stand-up" or collapse each sweep into a pulse, consequently the output of RAC 42 on output line 44 is a series of pulses each corresponding to a single sweep and hence to one of the original PSK channels 21.

As previously noted, imperfections in either of the RAC's 26, 42 can result in amplitude and phase deviations from the nominal monotonic function of the RAC. Phase distortions introduced by the first RAC 26 result in timing shifts of the individual channels. However, as a practical matter, much of the error introduced by the first RAC 26 is eliminated by the filtering action of the second RAC 42 and has immeasurable impact on the output of the processor 10. In contrast, distortion introduced by second RAC 42 can contribute significantly to intersymbol interference and thus impairs the performance of the processor 10. Phase distortion introduced by RAC 42 results in the misalignment of the frequency components of the pulse outputs, thus contributing to intersymbol interference. Additionally, pulse height is reduced, thereby impairing the signal-to-noise ratio of the system.

The frequency-varying time deviations at the output of the processor 10 resulting from imperfections in RAC 42 can be precompensated by introducing complimentary time-varying frequency deviations at its input through the use of the calibration section 45. Additionally, time-varying amplitude control over the input signal provides control over output pulse shapes so that intersymbol interference can be minimized. The precompensation can be applied to the incoming signals by multiplying it by a complex, time-varying function derived from the memory 20. Since the function is complex, both phase and amplitude can be modified. The complex digital words, each including a sign bit, are applied to the incoming signal seriatum in response to signals from the address generator 19. The series of digital words stored in memory 20 is specifically tailored to the second RAC 42. The details of the complex multiplier 22 are depicted in FIG. 5 and will be discussed later in more detail.

In order to determine the calibration function to be applied by the complex multiplier 22, a frequency synthesizer 59 is used to introduce a sine wave at the signal input 24, while a network analyzer 53 introduces a sine wave input into the frequency sweep 40 via line 55. The network analyzer 53 provides a phase amplitude function of frequency. In order that the frequency of the network analyzer input and output are matched, two mixers 43, 49 are provided. On of the mixers 43 parallels the function of the translation mixer 40, stepping up the input by the translation frequency. The lower sideband of the mixer 43 is rejected by the following filter 47, which thus parallels the filtration function of the second RAC 42.

The output of the processor 10 on line 44 is mixed with the translated reference output of the filter 47 and the other added filter rejects the upper sideband of the mixer 49. The retained lower sideband is at the frequency of the output of the network analyzer 53. The network analyzer 53 determines the amplitude and phase changes in its signal and the results are stored in the computer 57. This process is iterated in small frequency steps through the range of the frequency sweep 30. The result is a phase shift and amplitude function of frequency stored in the computer 57.

Preferably, the network analyzer 53 is employed to determine the transfer characteristic of the second added filter 51. The resulting phase and amplitude function is then subtracted by the computer 57 from the system transfer characteristic. In this manner, any distortions introduced by the filter 51 are ignored in determining the calibration function.

The purpose of the calibration function is to predistort or preprocess the incoming signal on the input 24 so as to minimize intersymbol interference in the TDM output 44. Intersymbol interference can be minimized where the individual pulses have a frequency distribution corresponding to a Kaiser-Bessel weighting function W(f).

The determined transfer function is expanded in terms of complex Legendre Polynomials and the linear phase term $P_1$ (f) is subtracted. Then, this modified transfer characteristic of the processor is expanded in a set of polynomials $R_i(f)$, where i is the set of non-negative integers. The R polynomials are selected to satisfy the following conditions:

$$\int_{-\frac{1}{2}}^{+\frac{1}{2}} W(f)R_o(f)df = 1$$

$$\int_{-\frac{1}{2}}^{+\frac{1}{2}} W(f)R_n(f)R_m(f)df = \begin{cases} 1 & n = m \\ 0 & m \neq n \end{cases}$$

where w(f) is the Kaiser Bessel weighting function.

Experience has shown that where the linear phase term is removed, as above, fewer than 10 terms are required to represent the transfer characteristic. The correction exponent then becomes:

$$\frac{C_{oc}R_o(f,t)}{C_{oc}R_o(f,t) + C_{1c}R_1(f,t) + C_{2c}R_2(f,t) \ldots C_{10c}R_{10}(f,t)}$$

where, $$C_{rc} = \int_{-\frac{1}{2}}^{\frac{1}{2}} W(f)G(f)R_n(f)df$$

and $$G(f) = |G(f)|e^{je(f)}$$

From the above expressions, it is apparent that, as a precorrection distortion, the $R_n$ polynomials are a function of time when applied prior to processing by the first RAC 26.

The calibration function is the natural logarithm e raised to the correction exponent. In the illustrated embodiment, the correction factor may be evaluated at 128 times during a symbol period and applied to the incoming signal the same number of times. The calibration function is stored in the memory 20 in the form of complex digital words, and is fed to the complex multiplier 22 in response to time and address cues from the address generator 19. The address generator 19 itself responds to system timing information received from the synchronization source 16 (FIG. 1). The calibration function can be checked by resetting the frequency synthesizer 59 at different points in the pass band of the first RAC 26.

The processor 10 and the system for determining the particular calibration function to be applied by the complex multiplier 22 to the incoming signal are described in more detail in U.S. patent application Ser. No. 679,323, filed Dec. 7, 1984, owned by the assignee hereof, the entire disclosure of which is incorporated by reference herein.

From the above, it is apparent that the inherent inaccuracies of the SAW Fourier transform processor 10 are corrected by precise digital preprocessing of the FDMA signal before it is converted into digital form. As a result of signal preprocessing, the FDMA channels are compressed to provide greater operating bandwidth, the transfer characteristics of the signals are improved, accurate timing of the final transform is achieved and the symbol periods of the input signals are properly aligned.

Attention is now directed to FIG. 3 wherein the details of one form of a demodulator 12a are depicted which is suitable for use in the device shown in FIG. 1. The demodulator shown in FIG. 3 represents a Costas-type carrier acquisition/data demodulator in which it is assumed that the time division multiplexed PSK signals output from the processor 10 take on one of four phases, i.e., Quadra-Phase Shift Keying (QPSK). The demodulator 12a includes a time-shared Costas loop for demodulating the signals into I, Q data patterns. The PSK signals output from the processor 10 are a sequence of pulses which have been multiplied by a carrier that is half way between the highest and lowest frequency of the input signals 18. The phase of the PSK signals corresponds to the phase of the carrier signal. Consequently, it is necessary to demodulate the phase on each of the output pulses. If each input pulse is the same relative strength, all the output pulses are of substantially equal amplitude.

The incoming PSK signal is replicated into two portions, the first of which is mixed with a translation signal by mixer 50, the second of which is also mixed by mixer 52 with the translation signal, the phase of which has been shifted 90° by a phase shifter 54. The translation signal is derived from a phase controlled oscillator 60, the phase of which is altered in a manner later described.

The respective portions of the translated, PSK signal are delivered through the low pass filters 56 and 58 which pass only the difference frequencies, and the resulting difference frequencies are delivered to corresponding limiters 68 and 70 and to associated multipliers 72 and 74. The limiters 68, 70 limit the different signals with respect to amplitude, and the outputs thereof are delivered to the opposite multiplier 72, 74. The output of the limiter 68 represents quadra-phase data which is delivered to the demultiplexer 14, while the output of the limiter 70 represents the in-phase data which is also delivered to the demultiplexer 14. The multiplier 72 multiplies the in-phase signal by the difference frequency, while multiplier 74 multiplies the difference frequency by the quadra-phase signal, and the resulting outputs of multipliers 72 and 74 are combined at a summer 76. The output of the summer 76 is filtered at 66 and is used to update an N-channel relative phase information data bank stored in a suitable memory 64. The relative phase information stored in memory 64 is combined by an adder 62 with the phase of a correction signal to control the phase of the oscillator 60. The relative phase information stored in memory 64 is employed to change the phase of the oscillator 60, depending upon the "phase history" of each channel.

As previously mentioned, it is necessary that the symbol periods period $T_s$ of the N-channels of PSK signals be aligned. This may be accomplished, for example, by dithering the position of a symbol window back and forth during modulation of the PSK input signals, and then through comparison of the amplitude of the output of the SAW Fourier transform processor 10 from one symbol period to the next, determining whether the symbol segment was early, on time or late.

Additionally, in order to assure symbol period alignment, the timing of the in-phase and quadra-phase data output from the demodulator 12 is delivered to an error signal generator 78. The amplitude of these output pulses is detected at 80 by summing the squares of the in-phase and quadra-phase data, and the detected amplitude is compared to the previous amplitude for the same channel by a suitable comparator at 82. Based on the results of the comparison made at 82, an error signal in the nature an early, on time or late flag is produced by a flag generator 84 for each channel. The flags produced by the flag generator 84 are combined by a time division multiplexer 86 and are delivered through a suitable transmission medium to the N user sources on a low power (bandwidth) channel and are then demultiplexed by a demultiplexer 88. These phase error signals are then employed by the users to adjust their corresponding clocks 90 such that all of the users clocks are in phase with each other, thus assuring that the symbol periods for all the channels are aligned with each other.

Reference is now made to FIG. 4 which depicts a preferred form 12b of the demodulator 12 which is implemented using digital techniques and which, again, uses a Costas type loop. A pair of mixers 96, 98 combine the incoming PSK signals with in-phase and quadra-phase translation frequency signals derived from a pair of complex multipliers 92, 94. The complex multipliers 92, 94 each include an analog input to which there is supplied a translation frequency derived from a reference oscillator 100. The translation frequency is multiplied by digitized, in-phase and quadra-phase error information derived from a digital processor 110.

Turning attention now momentarily to FIG. 5 which depicts the details of a typical complex multiplier of the type employed in the demodulator of FIG. 4 as well as in the SAW Fourier transform processor shown in FIG. 2, such multiplier is a device which simultaneously effects amplitude and phase modulation of an incoming analog signal by a digital signal, wherein a portion of the digital signal represents the real term of a complex multiplying expression and the other portion represents the imaginary term thereof. Effectively then, the incoming analog signal is multiplied by a complex digital number, thus permitting precision modulation of the incoming signal.

As shown in FIG. 5, the incoming analog signal is fed to a pair of mixers 112, 114, each of which is also fed by a sign wave source 115 which is in quadrature to a sign wave source 117 feeding the other mixer. The in-phase and quadra phase components of the analog input are down converted by the mixers 112, 114 following which a pair of filters 116, 118 reject the upper side bands of the respective component. The in-phase component of the analog signal is then amplitude modulated (including the sign bit) by the real part of a modifying, digital word received on line 124 by a real multiplier 120. Similarly, the quadra-phase component of the analog signal is amplitude modulated (including the sign bit) by the imaginary part of the digital word received on line 126 by a real multiplier 122. The resulting outputs of the real multipliers 120, 122 are added in a summer 128. Switching transients are then eliminated by a filter 130 and the output of filter 130 is up-converted in a mixer 132. A filter 134 rejects any unwanted "difference" side bands to provide the output at the original incoming frequency with the desired complex modulation applied to the input signal.

Returning now to FIG. 4, the in-phase and quadra-phase translated signals are processed by corresponding sample and hold units 102 and 104 and are then digitized by analog-to-digital converters 106 and 108. The digital outputs of the analog-to-digital converters 106 and 108 are delivered to the digital processor 110. The digital processor 110 may comprise any of various suitable circuits for demultiplexing the demodulated, time division multiplexed signals derived from the converters 106, 108. Additionally the digital processor 110 contains suitable circuitry of a type well known in the art for generating the low data rate TDM timing error signal which is sent to the N users to permit them to adjust there clocks in order to align the symbol periods. Finally, digital processor 110 will include suitable circuitry for generating phase error signals in the form of digital words which are delivered to the complex multipliers 92 and 94 and are employed to multiply the input analog signal consisting of the translation frequency from the reference oscillator 100. For example, the processor 110 may comprise a central processing unit or a pipeline processor, depending on the processing rate required in the particular application.

The I and Q phase error signals respectively delivered to the complex multipliers 92, 94 correct the phase of the reference oscillator 100. If the the reference oscillator 100 is off frequency, the I, Q, phase error will change at a given rate. The clock rate of the I, Q, phase error signals need only be commiserate with the difference frequency between the carrier frequency of any given pulse of the PSK signal and the carrier frequency of the reference oscillator 100.

The digitally implemented form 12b of the demodulator 12 shown in FIG. 4 is generally preferred since it overcomes problems associated with slew rate limitations of the VCO (Voltage Controlled Oscillator) and the limited bandwidth of phase shifters 52 employed in analog demodulators of the type shown in FIG. 3.

From the foregoing, it is apparent that the wide bandwidth demodulating device described above converts N-FDMA channels of PSK signals into a plurality of individually accessible streams of demodulated data using a single demodulator. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. For use in a telecommunications system having N-users each including a clock for transmitting data over a separate communication channel, a device for translating N-frequency division multiplexed channels of modulated data into N-individually accessible streams of demodulated data, each of the channels conveying phase shift keyed signals defined by successive symbol segments, each of the symbol segments having a symbol period $T_s$, comprising:

means for simultaneously receiving the N-channels of modulated data and for transforming the N-channels of modulated data into a phase modulated carrier signal defining a single time division multiplexed channel of modulated data, the phase of said carrier signal sequentially corresponding to the phases of the symbol segments of the N-channels of modulated data;

means for aligning the time of occurrence of the symbold periods $T_s$ relative to each other, said aligning means including means for generating error signals corresponding to the difference between the time of occurrence of said symbol periods $T_s$ and a preselected time base reference, and means for transmitting said error signals to said N-users, whereby said N-users may synchronize their respective clocks;

means connected to said receiving and transforming means for demodulating said phase modulated carrier signals; and, means connected to said demodulating means for demultiplexing the single time division multiplexed channel of demodulated data to provide N-individually accessible streams of demodulated data.

2. The device of claim 1, wherein said aligning means includes:

a master clock for generating time base reference signals defining said preselected time base reference, means for receiving the symbol segments and reference signals and for comparing the time of occurrence of said symbol periods $T_s$ with said reference signals, and, wherein said error signals correspond to the difference between said reference signals and the compared symbol periods.

3. The device of claim 2, wherein said aligning means includes:

means connected with said transmitting means for multiplexing the error signals associated with each of the N-channels, and, means for demultiplexing the multiplexed error signals for use by each of the N-users.

4. The device of claim 2, wherein said comparing means includes means for detecting the amplitude of each symbol segment.

5. The device of claim 1, wherein said demodulating means includes:
   a reference oscillator for supplying a translation frequency signal,
   means for receiving and mixing the translation frequency signal with said phase modulated carrier signal to provide a translated signal;
   means connected with said mixing means for converting the translated signal into multiplexed digital data,
   means responsive to said multiplexed digital data for generating phase error signals, and
   means responsive to said phase error signals for altering the frequency of said translation frequency signal.

6. The device of claim 5, wherein said means for generating phase error signals includes means for demultiplexing said multiplexed digital data and wherein said phase error signals are defined by multibit digital words.

7. The device of claim 6, wherein said means for altering the frequency of said translation frequency signal includes a complex multiplier having a digital input for receiving said translation frequency from said reference oscillator, said complex multiplier including means for multiplying said translation frequency by said multibit digital word.

8. A device for translating a frequency division multiplexed signal defining N-channels of modulated data into N individually accessible streams of demodulated data, each of said channels conveying a signal with successive symbol segments, comprising:
   first means for generating a single time division multiplexed channel of modulated signals which describe a Fourier transform of the N-frequency division multiplexed channels of modulated data, said first means including
   (1) means for receiving said frequency division multiplexed signal,
   (2) first analog dispersion means for introducing differential delays in said frequency division multiplexed signal as a first nominal monotonic delay function of frequency, said first analog dispersion means being characterized by a first actual delay function of frequency so as to stagger concurrently received signal segments,
   (3) a frequency sweep section for multiplying the staggered signal segments by a predetermined frequency sweep so as to produce a series of frequency sweep signals,
   (4) second analog dispersion means for introducing differential delays as a second nominal monotonic delay function of frequency, said second nominal function being selected so as to collapse into a pulse frequency sweep signal which is calculated to result from a signal input processed according to said first nominal function and said predetermined frequency sweep, said second analog dispersion means being characterized by a second actual delay function of frequency, and
   (5) a calibration section for compensating for deviation in said first and second actual delay functions from said first and second nominal delay functions so that the output of said second analog dispersion means is substantially that calculated for a system in which said actual delay functions are equal to said nominal functions;
   a single demodulator for receiving and demodulating the signals of said single time division multiplexed channel; and
   second means for receiving and demultiplexing the signals demodulated by said demodulator to provide individually accessible streams of demodulated data.

9. The device of claim 8, including third means for synchronizing the timing of the symbol periods period $T_s$ relative to each other such that the symbol periods $T_s$ of the signals in the N-multiplexed channels have the same time of occurrence.

10. The device of claim 9, wherein said third means includes means for generating error signals corresponding to the difference between the actual time of occurrence of the symbol periods $T_s$ and a preselected time reference.

11. The device of claim 10, wherein said generating means includes means for sampling the demodulated signals including means for detecting the amplitude of each signal in said single time division multiplexed channel, means responsive to said detecting means for comparing each detected amplitude with the amplitude of the previously sampled signal, and means for generating a flag indicating whether the sampled signal was on-time, early or late relative to said reference time.

12. The device of claim 10, wherein said third means includes:
   means for multiplexing the error signals,
   means for transmitting the multiplexed error signals to N-users, and
   means for demultiplexing said multiplexed error signals.

13. A device for converting a frequency division multiplexed signal defining N-channels of modulated data into N individually accessible streams of demodulated data, each of said channels conveying a signal with successive symbol segments, comprising:
   a Fourier transform processor for converting said frequency division multiplexed signal into a single time division multiplexed signal, said processor including at least one analog dispersion section for introducing differential delays in the frequency division multiplexed signal as a nominal monotonic delay function of frequency, said one analog dispersion section having inherent inaccuracies therein which cause deviations in the differential delays introduced into the frequency divisions multiplexed such that said one analog dispersion section is characterized by an actual delay function of frequency;
   means for preconditioning said frequency division multiplexed signal to compensate for the deviations of said actual delay function from said nominal delay function such that the output of said one analog dispersion section is substantially that calculated for a system in which said actual delay function is equal to said nominal delay function;
   a demodulator connected with said processor for demodulating said single time division multiplexed signal; and
   means connected with said demodulator for demultiplexing the demodulated time division multiplexed signal.

14. The device of claim 13, wherein said analog dispersion section includes a reflective acoustic coupler.

15. The device of claim 13, wherein said preconditioning means includes:

memory means for storing a calibration function, and
means connected with said memory means for receiving said frequency division multiplexed signal and for modifying said frequency division multiplexed signal in accordance with said stored calibration function.

16. The device of claim 15, wherein:
said memory means includes a plurality of storage locations and said calibration function includes a plurality of digital data words respectively stored in said stored in said storage locations,
said preconditioning means includes means for addressing said storage locations and for retrieving digital data words from said storage locations, and
said modifying means includes a multiplier for multiplying said frequency division multiplexed signal by a digital word retrieved from said memory means.

17. The device of claim 15, including means connected with said processor for receiving said single time division multiplexed signal and for generating said calibration function.

18. The device of claim 17, wherein said means for generating said calibration function include means for determining the amplitude and phase changes in said single time division multiplexed signal.

19. The device of claim 13, wherein said demodulator includes:
a reference oscillator for supplying a translation frequency signal,
means for receiving and mixing the translation frequency signal with said single time division multiplexed signal to provide a translated signal,
means connected with said mixing means for converting the translated signal into multiplexed digital data,
means responsive to said multiplexed digital data for generating phase error signals, and
means responsive to said phase error signals for altering the frequency of said translation frequency signal.

20. The device of claim 19, wherein said means for altering the frequency of said translation signal includes a complex multiplier having a digital input for receiving said phase error signals in digital word form and an analog input for receiving said translation frequency from said reference oscillator, said complex multiplier including means for multiplying said translation frequency by the digital words defining said phase error signals.

21. For use in a telecommunications system having N-users each including a clock for transmitting data over a separate communication channel, a device for translating N-frequency division multiplexed channels of modulated data into N-individually accessible streams of demodulated data, each of the channels conveying phase shift keyed signals defined by successive symbol segments, each of the symbol segments having a symbol period $T_s$, comprising:
a Fourier transform processor for simultaneously receiving the N-channels of modulated data and for transforming the N-channels of modulated data into a phase modulated carrier signal defining a single time division multiplexed channel of modulated data, the phase of said carrier signal sequentially corresponding to the phases of the symbol segments of the N-channels of modulated data;
means for aligning the time of occurrence of the symbol periods $T_s$ relative to each other, said aligning means including
(1) a master clock for generating time base reference signals,
(2) means for receiving the symbol segments and reference signals and for comparing the time of occurrence of said symbol period $T_s$ with said reference signals,
(3) means responsive to said comparing means for generating error signals corresponding to the difference betrween said reference signals and the compared symbol periods,
(4) means for multiplexing the error signals associated with each of the N-channels,
(5) means for transmitting the multiplexed error signals to each of said N-users, and
(6) means for demultiplexing the multiplexed error signals for use by each of the N-users;
means connected to said Fourier transform processor for demodulating said phase modulated carrier signal; and,
means connected to said demodulating means for demultiplexing the single time division multiplexed channel of demodulated data to provide N-individually accessible streams of demodulated data.

22. For use in a telecommunications system having N-users each including a clock for transmitting data over a separate communication channel, a device for translating N-frequency division multiplexed channels of modulated data into N-individually accessible streams of demodulated data, each of the channels conveying phase shift keyed signals defined by successive symbol segments, each of the symbol segments having a symbol period $T_s$, comprising:
a Fourier transform processor for simultaneously receiving the N-channels of modulated data and for transforming the N-channels of modulated data into a phase modulated carrier signal defining a single time division multiplexed channel of modulated data, the phase of said carrier signal sequentially corresponding to the phases of the symbol segments of the N-channels of modulated data;
means for aligning the time of occurrence of the symbol periods $T_s$ relative to each other, said aligning means including
(1) a master clock for generating time base reference signals,
(2) means for receiving the symbol segments and reference signals and for comparing the time of occurrence of said symbol periods $T_s$ with said reference signals, including means for detecting the amplitude of each symbol segment, and
(3) means responsive to said comparing means for generating error signals corresponding to the difference between said reference signals and the compared symbol periods;
means connected to said Fourier transform processor for demodulating said phase modulated carrier signal; and,
means connected to said demodulating means for demultiplexing the single time division multiplexed channel of demodulated data to provide N-individually accessible streams of demodulated data.

23. For use in a telecommunications system having N-users each including a clock for transmitting data over a separate communication channel, a device for translating N-frequency division multiplexed channels of modulated data into N-individually accessible streams of demodulated data, each of the channels conveying phase shift keyed signals defined by successive symbol segments, each of the symbol segments having a symbol period $T_s$, comprising:

a Fourier transform processor for simultaneously receiving the N-channels of modulated data and for transforming the N-channels of modulated data into a phase modulated carrier signal defining a single time division multiplexed channel of modulated data, the phase of said carrier signal sequentially corresponding to the phases of the symbol segments of the N-channels of modulated data;

means for aligning the time of occurrence of the symbol periods $T_s$ relative to each other;

means connected to said Fourier transform processor for demodulating said phase modulated carrier signal, said demodulating means including (1) a reference oscillator for supplying a translation frequency signal, (2) means for receiving and mixing the translation frequency signal with said phase modulated carrier signal to provide a translated signal;

(3) means connected with said mixing means for converting the translated signal into multiplexed digital data, (4) means responsive to said multiplexed digital data for generating phase error signals, including means for demultiplexing said multiplexed digital data, said phase error signals being defined by multibit digital words, and (5) means responsive to said phase error signals for altering the frequency of said translation frequency signals; and, means connected to said demodulating means for demultiplexing the single time division multiplexed channel of demodulated data to provide N-individually accessible streams of demodulated data.

24. The device of claim 23, wherein said means for altering the frequency of said translation frequency signal includes a complex multiplier having a digital input for receiving said translation frequency from said reference oscillator, said complex multiplier including means for multiplying said translation frequency by said multibit digital word.

* * * * *